United States Patent

Bauerschmidt et al.

[11] Patent Number: 6,020,821
[45] Date of Patent: Feb. 1, 2000

[54] METHOD OF DETECTING THE POSITION OF A SWITCHING DEVICE AND ENCAPSULATED SWITCHING INSTALLATION HAVING AT LEAST ONE SWITCHING DEVICE

[75] Inventors: Peter Bauerschmidt, Schwabach; Ottmar Beierl, Aurachtal; Wolf-Eckhart Bulst; Valentin Magori, both of München; Thomas Ostertag, Finsing; Leonhard Reindl, Stephanskirchen; Gerd Scholl, München; Oliver Sczesny, Aschheim; Dieter Lorenz, Berlin, all of Germany

[73] Assignee: Siemens Aktiengesellschaft, Munich, Germany

[21] Appl. No.: 09/127,526

[22] Filed: Jul. 31, 1998

Related U.S. Application Data

[63] Continuation of application No. PCT/DE97/00093, Jan. 20, 1997.

[30] Foreign Application Priority Data

Jan. 31, 1996 [DE] Germany .................. 196 03 461

[51] Int. Cl.[7] ................................................ G08B 21/00
[52] U.S. Cl. ................................ 340/644; 340/686.1
[58] Field of Search ............................ 340/644, 686.1, 340/687

[56] References Cited

U.S. PATENT DOCUMENTS

| | | | |
|---|---|---|---|
| 4,864,285 | 9/1989 | Rodden | 340/644 |
| 5,844,493 | 12/1998 | Pohl et al. | 340/644 |
| 5,874,900 | 2/1999 | Panto | 340/644 |
| 5,914,664 | 6/1999 | Scheele | 340/644 |

*Primary Examiner*—Edward Lefkowitz
*Attorney, Agent, or Firm*—Herbert L. Lerner; Laurence A. Greenberg

[57] ABSTRACT

A method for detecting the position of a switching device and an encapsulated switching installation having at least one switching device. A transmitted signal is emitted into the interior of an encapsulation to make it possible to easily detect the position of a switching device in an encapsulated switching installation. A resultant reflection signal is received and stored. After a repetition of this process, the two received reflection signals are compared with one another. In the event of any discrepancy, a message signal is produced for the new switching state.

14 Claims, 1 Drawing Sheet

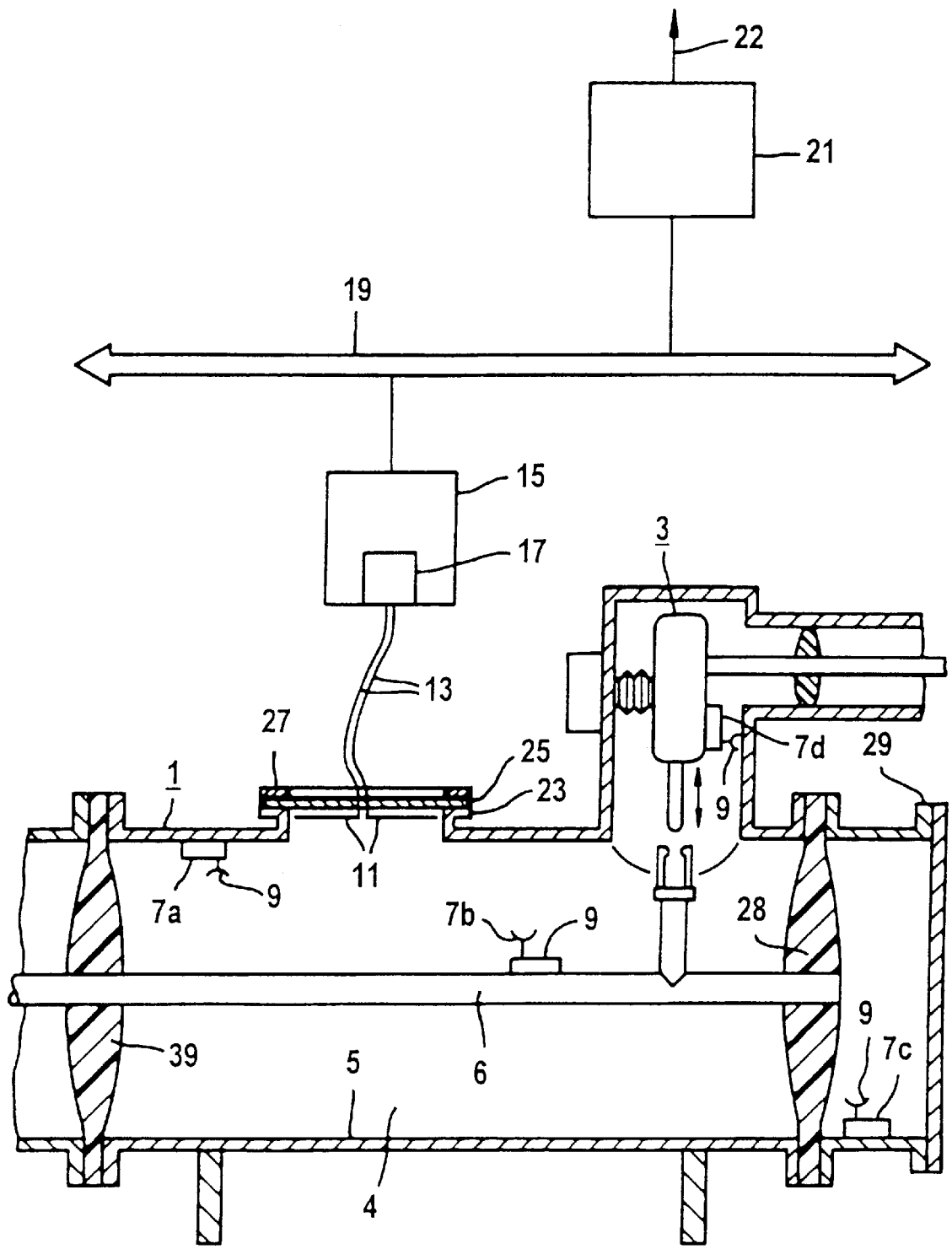

METHOD OF DETECTING THE POSITION OF A SWITCHING DEVICE AND ENCAPSULATED SWITCHING INSTALLATION HAVING AT LEAST ONE SWITCHING DEVICE

CROSS-REFERENCE TO RELATED APPLICATION

This application is a continuation of International Application No. PCT/DE97/00093, filed on Jan. 20, 1997, which designated the United States.

BACKGROUND OF THE INVENTION

Field of the Invention

The invention relates to a method for detecting the position of a switching device in an encapsulated switching installation, as well as a switching installation having a device for that purpose.

High or medium voltage switching installations generally require that there be a position indicator for the switching devices being used. That represents a problem in metal-encapsulated switching installations, since the switch position cannot be seen from the outside. In order to detect a position, mechanical devices have to be passed out of the encapsulation, for example, or cable-based detection devices having sensors, in particular contacts, have to be used.

Such devices are very costly and in each case are aimed only at the information specifically to be detected. In addition, the position information frequently also has to be electrically converted and processed, which results in a cost for wiring and signal processing.

German Utility Model 94 20 199 discloses a metal-encapsulated high-voltage switching installation in which a surface acoustic wave element (SAW) is disposed in one of its gas areas. The SAW is used to verify gas constituents, which are produced by the effect of arcing on the extinguishing gas that is contained in the encapsulation, or for detection of pressure waves. In that case, an antenna, which is used for wireless information transmission to an evaluation device, is disposed on the outside of the encapsulation.

The use of SAW sensors in high-voltage technology is disclosed in principle in an article entitled "Akustische Oberflächenwellen-Technologie für Innovationen" (Surface Acoustic Wave Technology for Innovations) from Siemens-Zeitschrift Spezial [Siemens Journal, Special] FuE, Spring 1994. It has also already been provided in that case for the SAW sensor to be mounted in the container and for its antenna to be mounted externally.

In principle, the state of the art discloses the detection of the position of a switching device through the use of the so-called "light barrier technique". A measuring light beam is likewise interrupted by a movable part of the switching device, and a message signal is derived therefrom. Reference is made in that regard to U.S. Pat. No. 4,945,256.

In Published French Patent Application FR 2 388 391 an optical signal is transmitted into the interior of the switching device in order to detect the position in an insulated switching device. That optical signal is reflected from the interior, starting from a separate position of the switching device. The reflection signal which is produced thereby is then received by a separate receiving sensor. A corresponding position indication is then produced independently of the reflection signal. If the light path is interrupted by a movable part of the switching device, a new signal is received from the receiving element. A respective positioning signal is assigned or produced in the evaluation device according to the received signal.

A similar technique is described in Published East German Patent Application DD 269 040 A1. There an optical transmitting signal is directed to a movable part of a switching device. A positioning signal for the switching device is produced by the respective received signals according to the received reflection level. In that reference as well as in Published French Patent Application FR 2 388 391, the received reflection signal is solely monitored for its level and is likewise compared with a predetermined level, in particular a barrier.

SUMMARY OF THE INVENTION

It is accordingly an object of the invention to provide a method for detecting the position of a switching device and an encapsulated switching installation having at least one switching device, which overcome the hereinafore-mentioned disadvantages of the heretofore-known methods and devices of this general type and which are simplified.

With the foregoing and other objects in view there is provided, in accordance with the invention, a method for detecting the position of at least one switching device in an encapsulated switching installation, which comprises:

a) transmitting a first transmitted signal developed as a radio signal, based on a first switch position of the switching device, into the interior of the encapsulation with a radio antenna;

b) reflecting the first transmitted signal from the interior and from the switching device and producing a first resultant reflection signal symbolizing or modeling an image of the interior;

c) receiving the first resultant reflection signal with the radio antenna and then storing the first resultant reflection signal;

d) transmitting a second transmitted signal developed as a radio signal into the interior of the encapsulation, and receiving and storing a second resultant reflection signal; and e) producing a message signal for a new switch position of the switching device in the event of a discrepancy between the two reflection signals.

In this way, position detection is possible without using wires. The position detection does not require any detection measures or sensors on the switching device, as a result of which no wiring cost or complex potential isolation measures are required.

In accordance with another mode of the invention, the transmitted signal may be an optical, acoustic or electromagnetic transmitted signal. At the same time, it is possible to use, for example, infrared light or radio-frequency signals, in dependence on adaptation to a respective application.

In accordance with a further mode of the invention, steps a) and b) are repeated for different switching states or switch positions of the switching device (3) and corresponding first reflection signals are stored, a second reflection signal which is detected in step c) is compared with the first, stored reflection signals, and a corresponding message signal for the respectively assumed switch position is produced in the event of correspondence with one of the first reflection signals. This permits selective detection of the respective switching states. Each switch position is virtually assigned a characteristic echo signal for the purpose of modeling or symbolizing it, and this signal is evaluated.

In accordance with an added mode of the invention, a disturbance signal or a fault message can be produced in the event of any discrepancy between the second reflection signal and one of the stored signals. In this way, it is also possible to evaluate switch positions which have not been stored or are unclear, or possibly unclear signals.

In accordance with an additional mode of the invention, the transmitted signal is used at the same time as a call-up signal for at least one sensor, in particular a surface acoustic wave sensor (SAW), which provides a favorable combination of a plurality of functions. At the same time, it may be possible to use the same hardware.

In accordance with yet another mode of the invention, alternatively, the transmitted signal can also be used as a signal for information transmission. In this way, data traffic is possible at the same time with a possibly remote transmitting/receiving station.

In accordance with yet a further mode of the invention, an alarm signal is emitted if, with the production of the message signal, a tripping signal is emitted by a protective device, for example a distance protection device or a busbar protection device, for a switching installation part which is located in the interior, or for the switching device. In this way, it is possible to signal critical operating situations and it is possible to monitor the correctness or the operation of the protective tripping at the same time. A weighted decision may also be possible in this case, with the aid of a fuzzy-logic element.

With the objects of the invention in view, there is also provided an encapsulated switching installation, comprising an encapsulation having an interior; at least one switching device disposed in the interior; a device for position detection having a transmitting/receiving device constructed as a radio antenna directed towards the interior; the transmitting/receiving device emitting a first transmitted signal developed as a radio signal into the interior based on a first switch position of the switching device, and receiving and storing a first resultant reflection signal produced by the interior and the switching device and symbolizing an image of the interior; the transmitting/receiving device emitting a second transmitted signal developed as a radio signal into the interior and receiving and storing a second reflection signal produced by the interior and by the switching device; and a comparison device receiving the two reflection signals and producing a message signal for a new switching state if a discrepancy exists between the two reflection signals.

The present new solution allows position detection at low cost. No sensors, cables or other detection measures are necessary in the switching installation. The detection is carried out from a point within the interior of the encapsulation. A multiplicity of switching devices can, of course, be monitored for this purpose within the interior.

In accordance with a concomitant feature of the invention, the transmitting/receiving device is at the same time constructed as a call-up device for a sensor, in particular a surface acoustic wave sensor, and/or as a transmitting/receiving station for information transmission within the encapsulation. This results in new multiple functions, which allow improved operation of the switching installation.

The terms "switching device" and "encapsulated switching installation" predominantly mean those electrical devices or components which can be switched or changed mechanically and which are accommodated in an encapsulation, a housing or a tank. In this case, the interior can be filled with a gas or any other insulating medium. Examples of this are an encapsulated switch disconnector or circuit breaker, an $SF_6$-insulated transformer having a tap switch, an encapsulated switching mechanism or an interlock device which is located in a tank.

Other features which are considered as characteristic for the invention are set forth in the appended claims.

Although the invention is illustrated and described herein as embodied in a method for detecting the position of a switching device and an encapsulated switching installation having at least one switching device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a fragmentary, diagrammatic, longitudinal-sectional view of an exemplary embodiment of a switching installation according to the invention.

DESCRIPTION OF THE PREFERRED EMBODIMENTS

A general explanation will be given initially with reference to the drawing regarding a switching installation having a monitoring device, in which information transmission at radio frequency is used. It is self-evident that the monitoring device described can also be used for other functions within the switching installation, for example for detection of a switch position without sensors by using a radar principle, for additional control tasks, or purely for information transmission.

Referring now to the figure of the drawing in detail, there is seen an encapsulated, gas-insulated switching installation 1, as is disclosed, for example, in the prior art according to the above-mentioned German Utility Model 94 20 199. The switching installation 1 is suitable for high or medium voltage. The term "switching installation" in this context also refers to an encapsulated tubular conductor.

A branch having a switching device 3, in particular a switch disconnector or an interrupter unit, is shown through a part of the switching installation 1 in the longitudinal section of FIG. 1. A busbar 6 runs centrally in an encapsulation 5 as an electrical conductor. Reference is made to the above-mentioned utility model for further details of the switching device 3 and its function.

Surface acoustic wave sensors (SAW) for a wide range of tasks, for example a SAW 7a for temperature detection, a SAW 7b for current detection, a SAW 7c for gas identification and a SAW 7d for position identification, are disposed as sensors in an interior 4 of the encapsulation 5 of the switching installation 1. Other SAWs are also conceivable in this case for other functions or tasks, for example for light identification or pressure measurement, etc.

Each SAW has at least one antenna 9 for information transmission, in particular for interrogation, as a receiving and transmitting device. The information transmission in this case is carried out from the SAWs 7a to 7d to a central transmitting and receiving antenna, which acts for all of the SAWs 7a to 7d and is referred to as an antenna element 11 in the following text.

The terms "antenna", "transmitting and receiving antenna", "antenna element" or "receiving and transmitting device" in this case mean those radiating and receiving elements which make it possible to transmit and/or receive electromagnetic or optical waves. Examples thereof are, for example, radio antennas and ultrasound or optical transmitting and receiving elements (for example infrared elements), although it is also possible for this to cover a split in the transmitting and receiving directions. As an example, the structure according to FIG. 1 relates to radio information transmission.

The antenna element 11 is connected through suitable cables 13, for example a coaxial cable, possibly with the interposition of a matching element, to a control and monitoring device (referred to as a monitoring device 15 in the following text). This monitoring device 15 includes a transmitting and receiving section 17 and a further device, which is not shown in more detail, for signal evaluation. It is also possible to cover a processor with a memory device, if required.

The transmitting and receiving section 17, or at least parts of it, can in principle also be disposed locally close to the antenna element 11, so that only low-power data traffic takes place between the monitoring device 15 and the antenna element 11. The transmitting power is then produced locally.

It is also conceivable for the antenna element 11 to be connected through the use of a local device by cables or without wires directly to a bus 19. The monitoring device 15, together with the transmitting and receiving section 17 and the connected antenna element 11, can also be referred to as a transmitting/receiving device or transceiver for the purposes of the present concept.

The monitoring device 15 may, for example, be a central unit in a switching installation or else a branch-related or equipment-related device, which is connected through a further data link, for example through the bus 19, to a higher level central computer 21, for data purposes. This central computer 21 may be a short-distance control central computer which, in turn, is connected through a suitable interface 22 to a higher-level network management center.

Of course the central computer 21 includes at least a suitable control and display device, for example a keyboard and a screen, for the operation of the switching installation 1.

Portable equipment, for example a portable computer or a laptop, can also be connected through suitable interfaces, which are not shown in more detail, to various points in the system shown in the FIGURE, for example to the bus 19 or to the control device 15, for control or for other inputs and outputs.

The data links which are shown may be constructed as required, for example as a cable-based connection, in particular a wire cable or optical conductor, or a wireless connection, such as a radio, sound or optical link.

In the present example, the antenna element 11 is disposed inside the encapsulation 5, at an opening. In this case the opening is formed by a flange 23, which is closed by a closure element 25, for example a cover and a compression ring 27. Of course lead-throughs for the flange connection, which are not shown in more detail, can be provided in this case according to the prior art.

The antenna element 11 is thus located inside the encapsulation 5 so that this results in the best conditions for problem-free information transmission to the SAWs 7a to 7d. Since the antenna element 11 is virtually located inside a connecting stub and does not project into the interior 4, electrical or in-service problems are avoided in this case.

In addition, the antenna element 11 forms a unit together with a component, which can be detached from the encapsulation 5 anyway, so that it is easily accessible or else can be retrofitted.

In this case, the SAWs 7a to 7d are disposed in such a way that some of them are on the encapsulation 5, some on the busbar 6, on a moving part of the switching device 3 or else on or behind a first insulated support 28, possibly in a separate gas area. A plurality of sensors for different functions may possibly be disposed together at one location and have a common antenna. It is also possible for one sensor to cover a plurality of measurement functions. The sensors can advantageously be constructed in the manner and size of a check card, with a majority of the card forming the antenna.

The essential feature for the operation of the entire monitoring system is that a reliable radio or data link exists inside the encapsulation 5. To this end, the insulated support 28 is manufactured from a dielectric material, so that radio-frequency transmission is also not adversely affected between the antenna element 11 and the SAW 7c, which is located behind the insulated support 28. In the case of other transmission methods, the material of the insulated support can be provided as appropriate (for example glass in the case of optical transmission).

The flange 23 or the opening which is required for the input coupling may, for example, be part of an existing maintenance opening, of a gas filling connecting stub, of a cast-resin filling opening, of a sight glass or else of an end flange. The structures which are described in this case by way of example can thus be used in principle for any possible openings on switching installations, for example for an illustrated end flange 29, as well. A specially introduced opening can also be used.

It is also conceivable for the antenna element 11 to be disposed outside the encapsulation 5 and to radiate into the interior 4 through a dielectric window. In this case, a filling connecting stub in the region of a connecting flange of two encapsulation sections may be used as the opening, for example, with the antenna element possibly being constructed as a rod antenna and being potted in the opening.

A configuration of a further antenna, which is not shown in more detail, has an associated control device in a gas area behind a further insulated support 39. In this case it is also possible to use the interior 4 of the encapsulation 5 as a transmission area, so that protected data transmission is possible over long distances. This option can be used in a preferred manner in the case of tubular conductors. A combination with a simultaneous sensor interrogation is conceivable.

The transmitting and receiving antenna 11 with the control device 15 and the transmitting and receiving section 17 may perform a further or alternative function as a transmitting/receiving device. Specifically, the transmitting/receiving device may be used for detecting the position of the switching device 3. The position is detected as follows:

First of all, a first transmitted signal is transmitted into the interior 4 of the encapsulation 5 by the transmitting and receiving antenna 11. This signal may be a specific signal for position detection or, as mentioned above, the call-up signal for a surface acoustic wave sensor. Transmission may possibly be carried out at a different frequency from that of SAWs 7a to 7d, so that better, selective detection is possible. Multiplex operation, that is to say alternately for each function, is possibly also conceivable.

The emitted transmitted signal propagates in the interior 4 of the encapsulation 5, is reflected and produces a first resultant reflection signal at the transmitting and receiving antenna 11. That signal is received and is stored in the transmitting/receiving device.

In a next step, a second transmitted signal is emitted into the interior 4, and a resultant, second reflection signal is received and stored.

Subsequently, the two reflection signals are then compared with one another. If there is any discrepancy, then it may be assumed therefrom that a mechanical change has taken place in the interior 4.

Since, during normal operating conditions, a mechanical change can be caused only by a part which has moved mechanically, in particular the switching device 3, the discrepancy is used as an indication that the switching state or the switch position of the switching device 3 has changed. A corresponding message signal for the new switching state is then produced. In this case, the transmitted signal can be an optical, acoustic or electromagnetic transmitted signal. This also applies, of course, for the interrogation technique of the SAWs 7a to 7d described above.

Only one frequency interval, one time interval or a specific frequency spectrum, which is characteristic for the respective interior 4, need be stored and compared for the evaluation of the reflection signal.

If there are a large number of possible switching states or if a plurality of switching devices are disposed inside one interior, it may be expedient for the maximum number of mechanical switching states to be stored virtually as a fingerprint, an echo pattern or signal pattern (respectively associated reflection signals of all of the combination possibilities of switching states) in a memory of the control device 15. The respective switch position or the installation state can be determined by comparison of the currently determined second reflection signal with the stored signals, without there being any need to access the installation inside the encapsulation 4 mechanically or optically. Only one installation location for the transmitting and receiving antenna 11 is required in this case. It is possibly also conceivable for a two-part transmitting and receiving antenna or an additional receiving antenna to be provided, so that improved evaluation of the reflection signal and/or of the response signal is possible.

A pattern or reflection signal which is stored for a specific switching state may also possibly be used as a reference signal for assessing further received reflection signals. If there is any discrepancy between the second received reflection signal and the stored, first reflection signals (that is to say they do not correspond), then an installation state is clearly present which does not correspond to a defined switching state. In this situation, a disturbance signal or defect message is produced.

Furthermore, an alarm signal can be produced if a tripping signal is emitted at the same time as the production of a message signal by the described device. The tripping signal is emitted by a protective device of the installation, which is responsible for the relevant switching installation part. In this case, it may be assumed that there is a relationship between the mechanical change and an electrical fault.

There may possibly even be a defect within the encapsulation, which requires that at least a part of the switching installation be switched off. The message, alarm and disturbance signals which are produced can then possibly cause the switching installation to be switched of. Other logic operations on signals are possible and conceivable in order to increase the operational reliability, or for fault diagnosis or localization. Furthermore, successful protective tripping can be monitored in this way. Linking or inclusion in an overall protective concept can thus take place. In addition, it is also possible to evaluate the signals produced on the basis of weighted criteria, so that early fault identification is possible even in unfavorable operating conditions. A self-learning or neural procedure is likewise conceivable.

The above-mentioned individual features and embodiments of the present new concept can, of course, be combined with one another or with features from the prior art within the scope of specialist trade, without departing from the basic essence of the invention. A large number of switching devices within one interior can be monitored with the configuration described herein. The essential feature for the new concept is that central, wireless monitoring of mechanical states is carried out without additional sensors. In particular, a combination with wireless sensor interrogation for further information is possible. At the same time, only one antenna and possibly only one lead-through are required on the encapsulation, for both functions.

We claim:

1. In a method for detecting the position of at least one switching device in an encapsulated switching installation, the improvement which comprises:
   a) transmitting a first radio signal, based on a first switch position of the switching device, into the interior of the encapsulation with a radio antenna;
   b) reflecting the first signal from the interior and from the switching device and producing a first resultant reflection signal symbolizing an image of the interior;
   c) receiving the first resultant reflection signal with the radio antenna and then storing the first resultant reflection signal;
   d) transmitting a second radio signal into the interior of the encapsulation, and receiving and storing a second resultant reflection signal; and
   e) producing a message signal for a new switch position of the switching device in the event of a discrepancy between the two reflection signals.

2. The method according to claim 1, which comprises transmitting the signal as an electromagnetic high frequency signal.

3. The method according to claim 1, which comprises:
   repeating steps a) and b) for different switch positions of the switching device and storing corresponding first reflection signals;
   comparing a second reflection signal detected in step c) with the first stored reflection signals; and
   producing a corresponding message signal for the respectively assumed switch position in the event of correspondence with one of the stored reflection signals.

4. The method according to claim 3, which comprises producing a disturbance signal in the event of a discrepancy between the second reflection signal and the first stored reflection signals.

5. The method according to claim 1, which comprises simultaneously using the transmitted signal as a call-up signal for at least one sensor to be interrogated wirelessly.

6. The method according to claim 5, which comprises using a surface acoustic wave sensor as the at least one sensor.

7. Th e method according to claim 1, which comprises simultaneously using the transmitted signal as a signal for information transmission.

8. The method according to claim 1, which comprises emitting an alarm signal if a tripping signal is emitted by a protective device for a relevant switching installation part or the switching device, along with the production of the message signal.

9. An encapsulated switching installation, comprising
   an encapsulation having an interior;
   at least one switching device disposed in said interior;

a device for position detection having a transmitting/ receiving device constructed as a radio antenna directed towards said interior;

said transmitting/receiving device emitting a first transmitted radio signal into said interior based on a first switch position of said switching device, and receiving and storing a first resultant reflection signal produced by said interior and said switching device and symbolizing an image of said interior;

said transmitting/receiving device emitting a second transmitted radio signal into said interior and receiving and storing a second reflection signal produced by said interior and by said switching device; and a comparison device receiving the two reflection signals and producing a message signal for a new switching state if a discrepancy exists between the two reflection signals.

10. The encapsulated switching installation according to claim 9, wherein said transmitting/receiving device simultaneously serves as a call-up device for a sensor.

11. The encapsulated switching installation according to claim 9, wherein said transmitting/receiving device simultaneously serves as a transmitting/receiving station for information transmission within the encapsulation.

12. The encapsulated switching installation according to claim 9, wherein said transmitting/receiving device simultaneously serves as a call-up device for a sensor and as a transmitting/receiving station for information transmission within the encapsulation.

13. The encapsulated switching installation according to claim 10, wherein said sensor is a surface acoustic wave sensor.

14. The encapsulated switching installation according to claim 12, wherein said sensor is a surface acoustic wave sensor.

* * * * *